US012338417B2

(12) United States Patent
Klemmer et al.

(10) Patent No.: US 12,338,417 B2
(45) Date of Patent: Jun. 24, 2025

(54) LIQUID WASHING OR CLEANING AGENT CONTAINING BLEACH PRECURSOR

(71) Applicant: Henkel AG & Co. KGaA, Duesseldorf (DE)

(72) Inventors: Anna Klemmer, Duesseldorf (DE); Peter Schmiedel, Duesseldorf (DE); Bent Rogge, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 734 days.

(21) Appl. No.: 17/170,234

(22) Filed: Feb. 8, 2021

(65) Prior Publication Data

US 2021/0179976 A1 Jun. 17, 2021

Related U.S. Application Data

(63) Continuation of application No. PCT/EP2019/070745, filed on Aug. 1, 2019.

(30) Foreign Application Priority Data

Aug. 7, 2018 (DE) ..................... 10 2018 213 192.9

(51) Int. Cl.
*C11D 3/39* (2006.01)
*C11D 17/00* (2006.01)

(52) U.S. Cl.
CPC .......... *C11D 3/3945* (2013.01); *C11D 3/3947* (2013.01); *C11D 17/0021* (2013.01); *C11D 2111/12* (2024.01); *C11D 2111/46* (2024.01)

(58) Field of Classification Search
CPC .................................................... C11D 3/3945
USPC .......................................................... 510/309
See application file for complete search history.

(56) References Cited

U.S. PATENT DOCUMENTS

2007/0001145 A1* 1/2007 Faryniarz ............. C11D 3/2058 252/186.42

FOREIGN PATENT DOCUMENTS

| | | | |
|---|---|---|---|
| EP | 0735133 | A1 | 10/1996 |
| EP | 0744462 | A2 | 11/1996 |
| WO | 9932598 | A1 | 7/1999 |
| WO | 2004029188 | A1 | 4/2004 |
| WO | 2007077088 | A1 | 7/2007 |

OTHER PUBLICATIONS

Simpson; William H. and Miller; John G.; The Decomposition of Peroxy Esters. II. The Photolysis of Esters of Aliphatic Peroxycarboxylic Acids, Journal of the American Chemical Society, Jul. 17, 1968, XP55930587A, U.S.

International Search Report & Written Opinion PCT/EP2019/070745 Completed: Oct. 24, 2019; Mailing Date: Nov. 4, 2019 11 Pages.

PCT International Search Report—WO PCT/EP2019/070745—Completed: Mar. 15, 2024 No. of pp. 5.

* cited by examiner

*Primary Examiner* — Liam J Heincer
(74) *Attorney, Agent, or Firm* — Bojuan Deng

(57) ABSTRACT

The present application is directed to water and surfactant-containing liquid washing or cleaning agents containing a hydrophobic precursor compound in microemulsified form, from which a peroxycarboxylic acid or the salt thereof can be released by UV radiation. Methods for washing textiles and cleaning hard surfaces using such precursor compounds are also included.

12 Claims, No Drawings

LIQUID WASHING OR CLEANING AGENT CONTAINING BLEACH PRECURSOR

FIELD OF THE INVENTION

Liquid washing agents are known in the art and have become increasingly popular with consumers in recent years because they offer a number of advantages over solid washing agents. These include simpler dosing and generally more rapid dissolution in the washing liquor. In addition, they are often perceived as safer and less aggressive towards textiles and the environment.

BACKGROUND OF THE INVENTION

Liquid agents, however, have the disadvantage that not all of the ingredients that are established in solid washing and cleaning agents and on the performance of which the user relies can be incorporated into these agents in a stable manner. For example, the incorporation of an effective bleaching system, which, in solid agents, usually consists of a peroxidic bleaching agent and a bleach activator that forms a peroxycarboxylic acid under perhydrolysis conditions, is problematic in liquid agents, because the stability of the bleach activator against hydrolytic attack usually cannot be sufficiently ensured, in particular in aqueous agents. In addition, the presence of oxidative bleaching agents can adversely affect the stability of other washing and cleaning agent ingredients, such as dyes, fragrances or enzymes. For this reason, various proposals have been made to separate the components of liquid agents which are not very compatible with one another by providing multi-compartment packaging for corresponding partial components of the finished agent, for example multi-chamber bottles from which the partial components are dosed together, or multi-chamber bags made of water-soluble film material, from the individual chambers of which the partial components are released simultaneously or in succession by dissolving the chamber walls.

A further known embodiment of the separation principle consists in wrapping at least one of the problematic ingredients with a protective layer which surrounds the ingredient during the preparation and storage of the liquid agent and prevents contact with the negatively interacting other ingredients, but breaks open under application conditions and releases the ingredient, so that said ingredient can contribute to the washing or cleaning result of the agent to the desired degree. Usually, differences in concentration between the liquid agent and the washing or cleaning liquid are used to dissolve the wrapping layer only under conditions of use of the agent.

In contrast to the known release mechanisms substantially based on water concentration or pH differences, the present invention uses targeted energy input in order to produce a reactive active ingredient from an ingredient that is stable when the liquid agent is stored.

BRIEF SUMMARY OF THE INVENTION

The invention relates to a water and surfactant-containing liquid washing or cleaning agent containing a hydrophobic precursor compound in microemulsified form, from which a peroxycarboxylic acid or the salt thereof can be released by UV radiation. Precursor compounds of this kind are contained in the agents according to the invention preferably in amounts of from 0.1 wt. % to 20 wt. %, in particular from 1 wt. % to 15 wt. %.

The invention also relates to the use of a combination of an aqueous microemulsion of a hydrophobic precursor compound, from which a peroxycarboxylic acid or the salt thereof can be released by UV radiation, and UV radiation for removing dirt when washing textiles or when cleaning hard surfaces. The microemulsion mentioned here can be a washing or cleaning agent according to the invention, but conventional components of washing and cleaning agents can also be missing; the microemulsion used according to the invention preferably contains from 2 wt. % to 12 wt. %, in particular from 4 wt. % to 10 wt. %, of the hydrophobic precursor compound, from 2 wt. % to 40 wt. %, in particular from 4 wt. % to 35 wt. % microemulsifiers, and water up to 100 wt. %.

The invention also relates to a washing or cleaning method in which a textile surface in need of cleaning or a hard surface in need of cleaning is brought into contact with a surfactant-containing aqueous washing or cleaning liquid containing a hydrophobic precursor compound in microemulsified form, from which a peroxycarboxylic acid or the salt thereof can be released by UV radiation, and allows UV radiation to act on the liquid. Such a method can be carried out manually or automatically, for example using a washing machine or a dishwasher, the washing machine or dishwasher having a device for UV radiation or the washing or cleaning liquid, in particular when the method is carried out manually, being manually exposed to a UV radiation source. Washing machines and dishwashers that have a UV radiation source are well known. The method according to the invention can be carried out at temperatures even below room temperature, in particular when using cold water for preparing the surfactant-containing aqueous washing or cleaning liquid, or is preferably carried out at temperatures in the range of from 5° C. to 60° C., in particular from 10° C. up to 40° C.

If desired, UV radiation can act on the liquid shortly before it is brought into contact with the object to be cleaned. It is preferable for exposure to UV radiation to take place when the washing or cleaning liquid is in contact with the textile to be washed or the hard surface to be cleaned; exposure to UV radiation is not necessary during the entire contact period, which is generally 1 minute up to 2 hours, in particular 2 minutes to 1 hour, but exposure can, if desired, begin even before contact.

As is known, UV radiation is electromagnetic radiation, which comprises the wavelengths from 100 nm to 380 nm in the spectrum. According to the invention, UV radiation is preferably used which has wavelengths in the range of from 100 nm to 300 nm, in particular from 240 nm to 270 nm, it being further preferable for the maximum intensity of the UV radiation to be in the range mentioned. The particularly preferred range of from 240 nm to 270 nm is in the UVC range and is not covered by sunlight, since its UVC portion is filtered out by the atmosphere before reaching the earth's surface. For example, mercury vapor lamps or light-emitting diodes (LEDs) can be used to generate the UV radiation that is essential to the invention. UV exposure times in the range of from 5 minutes to 40 minutes, in particular from 6 minutes to 30 minutes, are normally completely sufficient. Energy densities of UV radiation in the range of from 150 $mJ/cm^2$ to 400 $mJ/cm^2$, in particular from 200 $mJ/cm^2$ to 300 $mJ/cm^2$, measured on the surface of the washing or cleaning liquid, are normally completely sufficient.

DETAILED DESCRIPTION OF THE INVENTION

"Hydrophobic" in connection with the precursor compound means that said compound has an n-octanol/water partition coefficient log $K_{ow}$ at 20° C. of at least 0.5, preferably in the range of from 1 to 30, and in particular from 2 to 20.

The hydrophobic precursor compounds are used in microemulsified form. "Microemulsified," as used herein, refers to the generally known chemical meaning of the term, and indicates that at least one liquid is distributed in another with average droplet diameters in the one-digit to two-digit micrometer range and the normally immiscible liquids are present without visible segregation. The (o/w) microemulsions preferred according to the invention contain the precursor which is finely divided in water and is stabilized using a microemulsifier; they are optically isotropic, microstructured and thermodynamically stable. The microemulsifiers that can be used include alkylglycol ethers, alkoxylated fatty alcohols, alkoxylated oxo alcohols, alkoxylated fatty acid alkyl esters, fatty acid amides, alkoxylated fatty acid amides, polyhydroxy fatty acid amides, alkylphenol polyglycol ethers, amine oxides, alkyl (poly)glucosides, sulfonates, in particular alkylbenzene sulfonates and/or secondary alkane sulfonates, and mixtures thereof. Alkyl glycol ethers, sulfonates and mixtures thereof are particularly preferred. Microemulsifiers of this kind are contained in the agents according to the invention preferably in amounts of from 0.01 wt. % to 60 wt. %, in particular from 1 wt. % to 50 wt. %.

The precursor compounds which can be used according to the invention are obtained in particular from the peroxoesters of one of the general formulas (I) to (VI), (I)

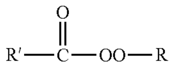

(II)

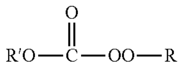

(III)

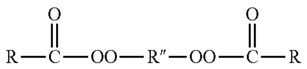

(IV)

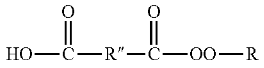

(V)

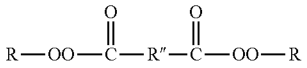

(VI)

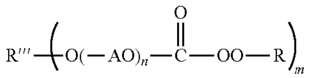

in which R represents a linear or branched-chain alkyl group having 1 to 30 C atoms, in particular 2 to 20 C atoms, R' represents a linear or branched-chain alkyl group having 1 to 30 C atoms, in particular 2 to 20 C atoms, R" represents a linear or branched-chain alkylene group having 1 to 30 C atoms, in particular 2 to 20 C atoms, R'" represents an m-valent linear or branched-chain alkyl group having 2 to 9 C atoms, in particular 3 to 5 C atoms, A represents an alkylene group having 2 to 4 C atoms, m represents a number from 2 to 6, in particular 3 or 4, and n represents a number from 2 to 30, in particular from 3 to 15, and mixtures thereof. Without being bound by this theory, these peroxoesters presumably produce radical intermediate compounds by exposure to UV radiation, which compounds react directly with colored stains on the surfaces to be cleaned or in the washing or cleaning liquid or form peroxoacids by reaction with water, for example, which peroxoacids can develop the bleaching performance of said peroxoesters. Peroxoesters of this type are commercially available under the name Luperox®.

Another advantage of the invention is that when such microemulsified hydrophobic precursor compounds are used, the stability of enzymes, for example proteases, in liquid agents during storage is just as high as if the precursor compound is dispensed with, whereas the same use of $H_2O_2$ or phthalimido peroxy hexanoic acid instead of the precursor leads to noticeable decreases in enzyme activity.

"Liquid," when used in relation to the agent according to the invention, includes all compositions which are flowable under standard conditions (20° C., 1013 mbar) and in particular also includes gels and pasty compositions. In particular, the term also includes non-Newtonian liquids which have a yield point. Unless indicated otherwise, the quantities indicated in connection with the constituents of the liquid agent described herein refer to wt. %, in each case based on the total weight of the agent. Moreover, amounts that relate to at least one constituent always relate to the total amount of this type of constituent contained in the agent, unless explicitly indicated otherwise. This means that specified amounts of this type, for example in connection with "at least one non-ionic surfactant," refer to the total amount of non-ionic surfactant contained in the agent.

"At least one," as used herein, refers to one or more, for example 1, 2, 3, 4, 5, 6, 7, 8, 9 or more. In connection with constituents of the compositions described herein, this information does not refer to the absolute amount of molecules, but to the type of the constituent. "At least one nonionic surfactant" therefore means, for example, one or more different non-ionic surfactants, i.e. one or more different types of non-ionic surfactants. Together with stated amounts, the stated amounts refer to the total amount of the correspondingly designated type of constituent, as defined above.

The liquid washing or cleaning agent according to the present invention preferably contains 1 wt. % to 60 wt. %, preferably 5 wt. % to 45% wt. % and, in particular if it is a washing agent, 15 wt. % to 40 wt. % of at least one surfactant.

Non-ionic surfactants that can be used include all known non-ionic surfactants commonly used in washing or cleaning agents, in particular those selected from the group consisting of alkyl glycol ethers, alkoxylated fatty alcohols, alkoxylated oxo alcohols, alkoxylated fatty acid alkyl esters, fatty acid amides, alkoxylated fatty acid amides, polyhydroxy fatty acid polyglycol amides, alkylphenol amide, amine oxides, alkyl (poly)glucosides and mixtures thereof. In a preferred embodiment of the invention, the agents contain, as a non-ionic surfactant, at least one fatty alcohol alkoxylate having the following formula $$R^1—O-(AO)_m—H,$$

in which $R^1$ is a linear or branched, substituted or unsubstituted alkyl functional group, AO is an ethylene oxide (EO) or propylene oxide (PO) group, and m is an integer from 1 to 50. In a preferred embodiment of the present invention, $R^1$ is a linear or branched alkyl functional group having 5 to 30 C atoms, preferably 7 to 25 C atoms, and in particular 10 to 19 carbon atoms. Preferred functional groups $R^1$ are selected from decyl, undecyl, dodecyl, tridecyl, tetradecyl, pentadecyl, hexadecyl, heptadecyl, octadecyl, nonadecyl functional groups and mixtures thereof, the representatives having an even number of C atoms being preferred. Particularly preferred functional groups $R^1$ are derived from fatty alcohols having 12 to 19 C atoms, for example from coconut fatty alcohol, tallow fatty alcohol, lauryl, myristyl, cetyl or stearyl alcohol, or from oxo alcohols having 10 to 19 C atoms. AO is an ethylene oxide (EO) or propylene oxide (PO) group, preferably an ethylene oxide group. The index m is an integer from 1 to 50, preferably from 2 to 20, and more preferably from 2 to 10. In particular, m is 3, 4, 5, 6 or 7. The agent according to the invention may contain mixtures of non-ionic surfactants having different degrees of ethoxylation. Surfactants having degrees of alkoxylation/ethoxylation of at least 5 are preferred. In summary, particularly preferred fatty alcohol alkoxylates are those of the formula

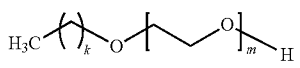

where k=9 to 17, and m=3, 4, 5, 6, or 7. Very particularly preferred representatives are fatty alcohols having 10 to 18 C atoms and 7 EO (k=11 to 17, m=7). Fatty alcohol ethoxylates of this kind are available under the trade names Dehydol® LT7 (BASF SE), Lutensol® A07 (BASF SE), Lutensol® M7 (BASF SE), and Neodol® 45-7 (Shell Chemicals). The above-mentioned fatty alcohol ethoxylates preferably have degrees of ethoxylation of at least 5, preferably 7. Such fatty alcohol ethoxylates can be used alone, as mixtures of such fatty alcohol ethoxylates or as mixtures with lower-ethoxylated fatty alcohol ethoxylates such as Lutensol® A03 (BASF). In such mixtures, it is preferred for the fatty alcohol ethoxylates having degrees of ethoxylation of at least 5, preferably 7, at least 50 wt. %, preferably at least 75 wt. %, to make up the total amount of fatty alcohol ethoxylates.

Further non-ionic surfactants which can be contained in the agents within the meaning of the present invention include, but are not limited to, alkyl(poly)glycosides, alkoxylated fatty acid alkyl esters, fatty acid alkanolamides, hydroxy mixed ethers, sorbitan fatty acid esters and polyhydroxy fatty acid amides. Suitable alkyl(poly)glycosides are, for example, those of the formula $R^2O\text{-}[G]_p$, in which $R^2$ is a branched alkyl having 12 to 16 carbon atoms, G is a sugar residue having 5 or 6 carbon atoms, in particular glucose, and the index p is 1 to 10. These can be contained in the agent in amounts of up to 5 wt. %, for example.

Furthermore, the liquid agent according to the present invention preferably contains 1 wt. % to 30 wt. %, in particular 2 wt. % to 20 wt. % and particularly preferably at least 10 wt. %, of at least one anionic surfactant. The anionic surfactants are preferably surfactants from the group of the sulfonates, in particular alkylbenzene sulfonates and/or secondary alkane sulfonates. In one embodiment, the agent according to the invention comprises at least one secondary alkane sulfonate. The at least secondary alkane sulfonate can be any known secondary alkane sulfonate that is suitable for the purpose according to the invention. "Secondary" refers to the generally known chemical meaning of this term, and indicates that the carbon atom to which the sulfonate group is covalently bonded still has two covalent bonds to two organic functional groups and one covalent bond to a hydrogen atom. Together with the carbon atom to which they are bonded, the two organic groups form a linear or branched alkyl group having 1 to 50 carbon atoms. In order to balance the negative charge of the sulfonate group, the alkane sulfonate further comprises any cation, preferably selected from the group $Na^+$, $K^+$, $NH_4^+$, ½$Zn^{2+}$, ½$Mg^{2+}$, ½$Ca^{2+}$, ½$Mn^{2+}$ and mixtures thereof, particularly preferably $Na^+$. Alternatively, the corresponding acid can also be used in various embodiments, i.e. the cation is $H^+$. In a preferred embodiment of the present invention, the at least one secondary alkane sulfonate has the formula $$R^1CH(SO_3^-X^+)R^2$$

where each of $R^1$ and $R^2$ is independently a linear or branched alkyl having 1 to 20 carbon atoms and, together with the carbon atom to which they are bonded, form a linear or branched alkyl group, preferably having 10 to 30 carbon atoms, preferably having 10 to 20 carbon atoms, and $X^+$ is selected from the group $Na^+$, $K^+$, $NH_4^+$, ½$Zn^{2+}$, ½$Mg^{2+}$, ½$Ca^{2+}$, ½$Mn^{2+}$ and mixtures thereof, preferably $Na^+$. As already mentioned above, $X^+$ can also be $H^+$ in various embodiments. In another preferred embodiment, the at least one secondary alkane sulfonate has the following formula $$H_3C—(CH_2)_n—CH(SO_3^-X^+)—(CH_2)_m—CH_3$$

where m and n are each, independently of one another, an integer between 0 and 20. Preferably, m+n is an integer between 7 and 17, preferably 10 to 14, and $X^+$ is selected from the group $Na^+$, $K^+$, $NH_4^+$, ½$Zn^{2+}$, ½$Mg^{2+}$, ½$Ca^{2+}$, ½$Mn^{2+}$ and mixtures thereof, preferably $Na^+$. As already mentioned above, $X^+$ can also be $H^+$ in various embodiments. In a particularly preferred embodiment, the at least one secondary alkane sulfonate is secondary $C_{14-17}$ sodium alkane sulfonate or the corresponding acid. A secondary $C_{14-17}$ sodium alkane sulfonate of this kind is marketed, for example, by Clariant under the trade name "Hostapur SAS60." At this point, it should be expressly noted that the agent described herein may contain a plurality of secondary alkane sulfonates.

Furthermore, in various embodiments, the agent described herein contains other anionic surfactants which can be used as an alternative or in addition to the secondary alkane sulfonates. Such anionic surfactants preferably include alkylbenzene sulfonates. Alkylbenzene sulfonates are preferably selected from linear or branched alkylbenzene sulfonates of the formula

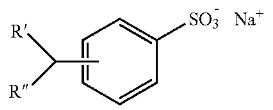

in which R' and R" are, independently of one another, hydrogen or alkyl, and together contain 9 to 19, preferably 9 to 15, and in particular 9 to 13, carbon atoms. A very particularly preferred representative is sodium dodecylbenzene sulfonate or the corresponding acid (HLAS). In other embodiments, $Na^+$ can be replaced by a cation selected from $K^+$, $NH_4^+$, ½$Zn^{2+}$, ½$Mg^{2+}$, ½$Ca^{2+}$, ½$Mn^{2+}$, and mixtures thereof, or also by $H^+$ (corresponding acid). In preferred embodiments, the secondary alkane sulfonates and alkylbenzene sulfonates described above are used in combination, in particular in a weight ratio of from 2:1 to 1:2, preferably 1:1. It is particularly preferred to use the alkylbenzene sulfonates in the acid form.

Finally, the agents can also contain further anionic surfactants, such as alkyl ether sulfates. Preferred are fatty alcohol ether sulfates of the following formula $$R^4—O\text{-}(AO)_n—SO_3^-X^+ \quad (V),$$

where $R^4$ is a linear or branched, substituted or unsubstituted alkyl group having 5 to 30 carbon atoms, preferably having 7 to 25 carbon atoms and more preferably having 10 to 19 carbon atoms. Furthermore, AO in the above formula represents an ethylene oxide (EO) or propylene oxide (PO) group, preferably an ethylene oxide (EO) group, and n is an integer from 1 to 50, preferably from 1 to 20 and more preferably from 2 to 10. $X^+$ is any cation and is preferably selected from the group $Na^+$, $K^+$, $NH_4^+$, ½$Zn^{2+}$, ½ $Mg^{2+}$, ½ $Ca^{2+}$, ½$Mn^2$, and mixtures thereof, particularly preferably $Na^+$. In a preferred embodiment, $R^4$ is a linear or branched alkyl functional group having 5 to 30 carbon atoms, preferably 7 to 25 carbon atoms, and in particular 10 to 19 carbon atoms. Preferred functional groups $R^4$ are selected from decyl, undecyl, dodecyl, tridecyl, tetradecyl, pentadecyl, hexadecyl, heptadecyl, octadecyl, nonadecyl functional groups and mixtures thereof, the representatives having an even number of carbon atoms being preferred. Particularly preferred functional groups $R^4$ are derived from fatty alcohols having 12 to 19 carbon atoms, for example from coconut fatty alcohol, tallow fatty alcohol, lauryl, myristyl, cetyl or stearyl alcohol, or from oxo alcohols having 10 to 19 carbon atoms. The agent may contain mixtures of surfactants having different degrees of alkoxylation n. The fatty alcohol ether sulfate used can also be one of the formula

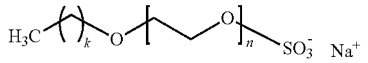

where k=11 to 19, and n=2, 3, 4, 5, 6, 7 or 8. Very particularly preferred representatives are Na fatty alcohol ether sulfates having 12 to 18 carbon atoms and 2 EO (k=11 to 13, n=2). The degree of ethoxylation n indicated represents a statistical average that can correspond to an integer or a fractional number for a specific product. In general, the degrees of alkoxylation indicated represent statistical averages that can correspond to an integer or a fractional number for a specific product. Preferred alkoxylates/ethoxylates have a narrowed homolog distribution (narrow range ethoxylates, NRE).

In addition, the liquid agent, in particular if it is a washing agent, can contain at least one fatty acid. The term "fatty acid," as used herein, refers to branched or unbranched carboxylic acids and the salts thereof, what are referred to as soaps, having 6 to 22, preferably 12 to 18, carbon atoms. The fatty acid soaps can be present in the form of the sodium, potassium or magnesium or ammonium salts thereof. In saponified form, they are preferably in the form of the sodium salts and/or ammonium salts thereof. Amines that can be used for neutralization are preferably choline, triethylamine, monoethanolamine, diethanolamine, triethanolamine, methylethylamine, or a mixture thereof, monoethanolamine being preferred. In various embodiments, the fatty acids are used as such, i.e. not saponified. For example, they can be dissolved in one or more constituents of the agent, preferably the at least one non-ionic surfactant, and combined in this dissolved form with the other constituents of the agent. The fatty acid can be present in the final product in emulsified form.

Preferred liquid washing agents also contain water as a solvent. In embodiments of the invention, the agents contain 4 wt. % to 25 wt. %, in particular 6 wt. % to 15 wt. %, water; in other embodiments of the invention, the agents contain more than 25 wt. % and up to 90 wt. % water, in particular 35 wt. % to 65 wt. % water. The liquid agents may also contain one or more non-aqueous, organic solvents. Suitable non-aqueous solvents include monovalent or polyvalent alcohols, alkanol amines or glycol ethers. Preferably, the solvents are selected from ethanol, n-propanol, i-propanol, butanols, glycol, propanediol, butanediol, methylpropanediol, glycerol, glycols, such as diglycol, propyl diglycol, butyl diglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl ether, propylene glycol ethyl ether, propylene glycol propyl ether, dipropylene glycol mono methyl ether, dipropylene glycol mono ethyl ether, methoxytriglycol, ethoxytriglycol, butoxytriglycol, 1-butoxyethoxy-2-propanol, 3-methyl-3-methoxybutanol, propylene-glycol-t-butylether, di-n-octylether, and low-molecular polyalkylene glycols, such as PEG 400, and mixtures thereof. In a preferred embodiment, the non-aqueous solvent is selected from the group consisting of ethanol, n-propanol, i-propanol, butanols, glycol, propanediol, butanediol, methylpropanediol, glycerol, and mixtures thereof. In a preferred embodiment, the non-aqueous solvent contains 1,2-propanediol, glycerol or a mixture thereof, very particularly preferably glycerol.

The agents according to the invention preferably have a viscosity (Brookfield rotational viscometer; spindle adapted to the viscosity range) in the range of from 1 mPa·s to 1000 mPa·s, in particular from 5 mPa·s to 500 mPa·s. An agent according to the invention is also preferably translucent, in particular transparent, i.e. it has no optically perceptible cloudiness.

In general, the pH of the liquid washing agent according to the invention can be adjusted by means of conventional pH regulators and is preferably in the range of from pH 5 to pH 10, in particular from pH 7 to pH 9; these relate to the pH of a 1% (wt. %) solution of the agent in distilled water at 30° C.

Suitable pH adjusters include acids and/or alkalis. Suitable acids are organic acids, such as acetic acid, glycolic acid, lactic acid, succinic acid, adipic acid, malic acid, tartaric acid and gluconic acid, or sulfamic acid. In addition, however, the mineral acids hydrochloric acid, sulfuric acid and nitric acid or mixtures thereof can also be used. Suitable bases originate from the group of alkali and alkaline-earth metal hydroxides and carbonates, in particular alkali metal hydroxides, of which potassium hydroxide and especially sodium hydroxide is preferred. Volatile alkali can also be used, for example in the form of ammonia and/or alkanolamines which can contain up to 9 carbon atoms in the molecule. The alkanolamine is preferably selected from the group consisting of mono-, di-, triethanol- and propanolamine and mixtures thereof.

In addition, the agent can also contain other ingredients which further improve its practical and/or aesthetic properties. In the context of the present invention, the washing agent preferably additionally contains one or more substances from the group of enzymes, builders, complexing agents, electrolytes, perfumes, perfume carriers, fluorescing agents, dyes, hydrotropic substances, suds suppressors, silicone oils, anti-redeposition agents, graying inhibitors, anti-shrink agents, anti-crease agents, dye transfer inhibitors, antimicrobial active ingredients, germicides, fungicides, antioxidants, preservatives, corrosion inhibitors, antistatic agents, bittering agents, ironing aids, repellents and impregnating agents, swelling and anti-slip agents, softening components and UV absorbers.

The agents preferably contain at least one enzyme. The at least one enzyme can be any enzyme known in the art which can develop a catalytic activity in a washing or cleaning agent and includes, but is not limited to, proteases, amylases, lipases, cellulases, hemicellulases, mannanases, pectin-cleaving enzymes, tannases, xylanases, xanthanases, β-glucosidases, carrageenases, perhydrolases, oxidases, oxidoreductases and mixtures thereof. In a preferred embodiment, the at least one enzyme is selected from the group consisting of proteases, amylases, lipases, cellulases, and mixtures thereof. These enzymes are in principle of natural origin; however, starting from the natural molecules, variants that have been improved for use in washing or cleaning agents are available, which are preferably used accordingly.

Among the proteases, the subtilisin-type proteases are preferred. Examples of these are the subtilisins BPN' and Carlsberg, protease PB92, subtilisins 147 and 309, the alkaline protease from *Bacillus lentus*, subtilisin DY, and the enzymes thermitase, proteinase K and proteases TW3 and TW7, which belong to the subtilases but no longer to the subtilisins in the narrower sense. Subtilisin Carlsberg is available in a developed form under the trade name Alcalase® from Novozymes A/S, Bagsvaerd, Denmark. Subtilisins 147 and 309 are marketed by Novozymes under the trade names Esperase® and Savinase®, respectively. The protease variants marketed under the name BLAP® are derived from the protease from *Bacillus lentus* DSM 5483. Other proteases that can be used are, for example, the enzymes available under the trade names Durazym®, Relase®, Everlase®, Nafizym®, Natalase®, Kannase® and Ovozyme® from Novozymes, the enzymes available under the trade names Purafect®, Purafect® OxP, Purafect® Prime, Excellase® and Properase® from Genencor, the enzyme available under the trade name Protosol® from Advanced Biochemicals Ltd., Thane, India, the enzyme available under the trade name Wuxi® from Wuxi Snyder Bioproducts Ltd., China, the enzymes available under the trade names Proleather® and Protease P® from Amano Pharmaceuticals Ltd., Nagoya, Japan, and the enzyme available under the name Proteinase K-16 from Kao Corp., Tokyo, Japan. The proteases from *Bacillus gibsonii* and *Bacillus pumilus* are particularly preferably used.

Examples of amylases are α-amylases from *Bacillus licheniformis*, from *B. amyloliquefaciens* or from *B. stearothermophilus*, as well as the developments thereof that have been improved for use in washing or cleaning agents. The enzyme from *B. licheniformis* is available from Novozymes under the name Termamyl® and from Genencor under the name Purastar®ST. Development products of this α-amylase are available from Novozymes under the trade names Duramyl® and Termamyl®ultra, from Genencor under the name Purastar®OxAm, and from Daiwa Seiko Inc., Tokyo, Japan, as Keistase®. The α-amylase from *B. amyloliquefaciens* is marketed by Novozymes under the name BAN®, and derived variants from the α-amylase from *B. stearothermophilus* are marketed under the names BSG® and Novamyl®, also by Novozymes. Others that are particularly noteworthy for this purpose are the α-amylases from *Bacillus* sp. A 7-7 (DSM 12368) and cyclodextrin glucanotransferase (CGTase) from *B. agaradherens* (DSM 9948). Fusion products of all mentioned molecules can also be used. Furthermore, the developments of the α-amylase from *Aspergillus niger* and *A. oryzae*, available under the trade name Fungamyl® from Novozymes, are suitable. Other commercial products that can advantageously be used are, for example, Amylase-LT®, and Stainzyme® or Stainzyme Ultra® or Stainzyme Plus®, the latter also being from Novozymes. Variants of these enzymes that can be obtained by point mutations can also be used according to the invention.

Examples of lipases or cutinases that can be used, which are contained in particular due to their triglyceride-cleaving activities, are the lipases that can be originally obtained or developed from *Humicola lanuginosa* (*Thermomyces lanuginosis*), in particular those with the amino acid exchange D96L. These are marketed for example by Novozymes under the trade names Lipolase®, Lipolase®Ultra, LipoPrime®, Lipozyme® and Lipex®. Moreover, the cutinases which have been originally isolated from *Fusarium solani pisi* and *Humicola insolens* can also be used, for example. Lipases that can also be used are available from Amano under the names Lipase CE®, Lipase P®, Lipase B®, and Lipase CES®, Lipase AKG®, *Bacillus* sp. Lipase®, Lipase AP®, Lipase M-AP® and Lipase AML®. From Genencor, the lipases or cutinases of which the starting enzymes have been isolated originally from *Pseudomonas mendocina* and *Fusarium* solanii can be used, for example. The preparations M1 Lipase® and Lipomax® originally marketed by Gist-Brocades, the enzymes marketed by Meito Sangyo KK, Japan, under the names Lipase MY-30®, Lipase OF® and Lipase PL®, and the product Lumafast® from Genencor should be mentioned as other important commercial products.

Depending on their purpose, cellulases can be present as pure enzymes, as enzyme preparations or in the form of mixtures in which the individual components are advantageously complementary in terms of their different performance aspects. These performance aspects include in particular anything from contributions of the cellulase to the primary washing performance of the agent (cleaning performance), the secondary washing performance of the agent (anti-redeposition or graying inhibitors) and softening (effect on fabric), to producing a "stonewashed" effect. A usable fungal cellulase preparation that is rich in endoglucanase (EG) and the developments thereof are provided by Novozymes under the trade name Celluzyme®. The products Endolase® and Carezyme® also available from Novozymes are based on 50 kD-EG and 43 kD-EG, respectively, from *H. insolens* DSM 1800. Other commercial products from this company that can be used are Cellusoft®, Renozyme® and Celluclean®. It is also possible to use, for example, 20 kD-EG from *Melanocarpus*, which are available from AB Enzymes, Finland under the trade names Ecostone® and Biotouch®. Other commercial products from AB Enzymes are Econase® and Ecopulp®. Other suitable cellulases are from *Bacillus* sp. CBS 670.93 and CBS 669.93, the cellulase from *Bacillus* sp. CBS 670.93 being available from Genencor under the trade name Puradax®. Other commercial products from Genencor are "Genencor detergent cellulase L" and IndiAge®Neutra. Variants of these enzymes that can be obtained by point mutations can also be used according to the invention. Particularly preferred cellulases are *Thielavia terrestris* cellulase variants, cellulases from *Melanocarpus*, in particular *Melanocarpus albomyces*, EGIII-type cellulases from *Trichoderma reesei*, or variants that can be obtained therefrom.

Furthermore, other enzymes which can be grouped together under the term "hemicellulases" can be used in particular to remove specific problematic stains. These include, for example, mannanases, xanthan lyases, xanthanases, xyloglucanases, xylanases, pullulanases, pectin-cleaving enzymes, and β-glucanases. The β-glucanase obtained from *Bacillus subtilis* is available from Novozymes under the name Cereflo®. Hemicellulases that are particularly preferred according to the invention are mannanases which are marketed, for example, under the trade names Mannaway® by Novozymes or Purabrite® by Genencor. In the context of the present invention, the pectin-cleaving enzymes also include enzymes having the names pectinase, pectate lyase, pectin esterase, pectin demethoxylase, pectin methoxylase, pectin methylesterase, pectase, pectin methylesterase, pectinesterase, pectin pectyl hydrolase, pectin depolymerase, endopolygalacturonase, pectolase, pectin hydrolase, pectin polygalacturonase, endopolygalacturonase, poly-α-1,4-galacturonide, glycanohydrolase, endogalacturonase, endo-D-galacturonase, galacturan 1,4-α-galacturonidase, exopolygalacturonase, poly(galacturonate) hydrolase, exo-D-galacturonase, exo-D-galacturonanase, exopoly-D-galacturonase, exo-poly-α-galacturonosidase, exopolygalacturonosidase, or exopolygalacturanosidase. Examples of enzymes that are suitable in this regard are available for example under the names Gamanase®, Pektinex AR®, XPect® or Pectaway® from Novozymes, under the names Rohapect UF®, Rohapect TPL®, Rohapect PTE100®, Rohapect MPE®, Rohapect MA plus HC, Rohapect DA12L®, Rohapect 10L®, Rohapect B1L® from AB Enzymes, and under the name Pyrolase® from Diversa Corp., San Diego, CA, USA.

The liquid agents contain the at least one enzyme preferably in total amounts established in the prior art. The at least one enzyme can therefore be contained in a total amount of from $1\times10^{-8}$ to 5 wt. %, based on active protein, or in a total amount of from 0.001 to 3 wt. %, or 0.01 to 1.5 wt. %, or 0.05 to 1.25 wt. %. The stated amounts are to be understood such that each enzyme contained can be contained in the stated amounts. The enzymes are preferably used as an enzyme liquid formulation or formulations.

The at least one enzyme that is present in a washing or cleaning agent supports the cleaning performance of the agent on certain soiling or stains. An agent according to the invention particularly preferably contains a plurality of enzymes, it being possible for the enzymes to belong to the same or different enzyme classes. Particularly preferably, the enzymes exhibit synergistic effects with regard to their impact on specific stains or spots, i.e. the enzymes contained in the composition support one another in their performance.

In particular polymers based on terephthalate-PEG can be used as anti-redeposition agents. Alternatively, (co)polymers based on polyethyleneimine, polyvinyl acetate and polyethylene glycol can also be used.

Organic builders are particularly suitable as builders, for example the polycarboxylic acids which can be used in the form of the sodium salts thereof or as acids, polycarboxylic acids being understood to mean those carboxylic acids that carry more than one acid function. These include, for example, adipic acid, succinic acid, glutaric acid, malic acid, tartaric acid, maleic acid, fumaric acid, saccharic acids, aminocarboxylic acids, in particular glutamic acid-N,N-diacetic acid (GLDA) and methylglycine-N,N-diacetic acid (MGDA), and mixtures thereof. Polymeric polycarboxylates are also suitable as builders. These are, for example, the alkali metal salts of polyacrylic acid or of polymethacrylic acid, for example those having a relative molecular mass of from 600 to 750,000 g/mol. Suitable polymers are in particular polyacrylates which preferably have a molecular mass of from 1,000 to 15,000 g/mol. Due to their superior solubility, the short-chain polyacrylates, which have molar masses of from 1,000 to 10,000 g/mol, and particularly preferably from 1,000 to 5,000 g/mol, can in turn be preferred from this group. In addition, copolymeric polycarboxylates are suitable, in particular those of acrylic acid with methacrylic acid and of acrylic acid or methacrylic acid with maleic acid. To improve water solubility, the polymers can also contain allyl sulfonic acids, such as allyloxybenzene sulfonic acid and methallyl sulfonic acid, as monomers. Soluble builders, such as acrylic polymers having a molar mass of from 1,000 to 5,000 g/mol, are preferably used in liquid washing agents.

The agents can additionally contain phosphonates, such as HEDP (1-hydroxyethane-1,1-diphosphonic acid) or DTPMP (diethylenetriamine penta(methylene phosphonate), as builders and complexing agents.

The liquid washing and cleaning agents can be prepared in an analogous application by methods known in the prior art. They can be placed into a water-soluble wrapping and thus be a constituent of a water-soluble packaging. If the agent is packaged in a water-soluble wrapping, it is preferable for the water content to be less than 10 wt. %, based on the total agent, and for the anionic surfactants to be present in the form of the ammonium salts thereof or as free acids. In addition to the agent, a water-soluble packaging contains a water-soluble wrapping. The water-soluble wrapping is preferably formed by a water-soluble film material. Water-soluble packagings of this kind can be produced either by methods of vertical form fill sealing (VFFS) or by thermoforming methods. The thermoforming method generally includes forming a first layer from a water-soluble film material in order to produce bulges for receiving a composition, pouring the composition into the bulges, covering the bulges filled with the composition with a second layer made of a water-soluble film material, and sealing the first and second layers to one another at least around the bulges. The water-soluble wrapping is preferably made from a water-soluble film material selected from the group consisting of polymers or polymer mixtures. The wrapping may be made up of one or of two or more layers of the water-soluble film material. The water-soluble film material of the first layer and of the additional layers, if present, may be the same or different. The water-soluble packaging, comprising the agent and the water-soluble wrapping, may have one or more chambers. The liquid agent may be contained in one or more chambers, if present, of the water-soluble wrapping. The amount of liquid agent preferably corresponds to the full or half dose required for a washing or cleaning cycle. It is preferable for the water-soluble wrapping to contain polyvinyl alcohol or a polyvinyl alcohol copolymer. Suitable water-soluble films for producing the water-soluble wrapping are preferably based on a polyvinyl alcohol or a polyvinyl alcohol copolymer of which the molecular weight is in the range of from 10,000 to 1,000,000 g/mol, preferably from 20,000 to 500,000 g/mol, particularly preferably from 30,000 to 100,000 g/mol, and in particular from 40,000 to 80,000 g/mol. Polymers selected from the group comprising acrylic acid-containing polymers, polyacrylamides, oxazoline polymers, polystyrene sulfonates, polyurethanes, polyesters, polyethers, polylactic acid, and/or mixtures of the above polymers may additionally be added to a film material suitable for producing the water-soluble wrapping. Preferred polyvinyl alcohol copolymers include, in addition to vinyl alcohol, dicarboxylic acids as further monomers. Suitable dicarboxylic acids are itaconic acid, malonic acid, succinic acid and mixtures thereof, with itaconic acid being preferred. Polyvinyl alcohol copolymers which include, in addition to vinyl alcohol, an ethylenically unsaturated carboxylic acid, or the salt or ester thereof, are also preferred. Polyvinyl alcohol copolymers of this kind particularly preferably contain, in addition to vinyl alcohol, acrylic acid, methacrylic acid, acrylic acid ester, methacrylic acid ester or mixtures thereof. Suitable water-soluble films for use in the wrappings of the water-soluble packaging according to the invention are films which are sold by MonoSol LLC, for example under the names M8630, C8400 or M8900. Other suitable films include films named Solublon® PT, Solublon® GA, Solublon® KC or Solublon® KL from Aicello Chemical Europe GmbH or the films VF-HP from Kuraray. The water-soluble packaging can have a substantially dimensionally stable spherical or pillow-shaped design with a circular, elliptical, square or rectangular basic shape. The water-soluble packaging may have one or more chambers for storing one or more agents. If the water-soluble packaging has two or more chambers, at least one chamber contains a liquid agent according to the invention, and the further chambers can each contain a solid or a differently composed liquid agent, or the contents of the individual chambers together result in a liquid agent according to the invention.

EXAMPLES

By simply shaking the mixing vessel, microemulsions were produced from 10 parts by weight of one of the peroxoesters A, B and C given below, 10 parts by weight of 4-fold ethoxylated $C_{10}$ Guerbet alcohol (Lutensol® XL40) and 75 parts by weight of water at room temperature.

and an energy density of 221.4 mJ/$cm^2$ at a distance of 3 cm or left in a light-impermeable box for the same time ("non-irradiated"). After the irradiation, the fabric swatches were rinsed with water, dried, and their brightness measured. The table below shows the difference in L values after and before treatment; negative values mean that the soiling has become darker, positive values mean that the soiling is lightened.

TABLE

| Differences in brightness | | | |
|---|---|---|---|
| Peroxoester | | non-irradiated | irradiated |
| A | microemulsified | −4.18 | 15.25 |
| A | not emulsified | −7.21 | −5.21 |
| B | microemulsified | −3.85 | 16.55 |
| B | not emulsified | −9.25 | −2.87 |
| C | microemulsified | ND | 16.55 |
| C | not emulsified | −7.41 | −2.68 |

ND: not determined

What is claimed is:

1. A washing or cleaning method, comprising the steps of: bringing a textile surface in need of cleaning or a hard surface in need of cleaning into contact with a surfactant-containing aqueous washing or cleaning liquid containing a

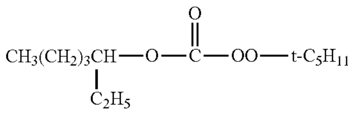

A

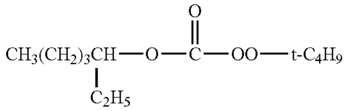

B

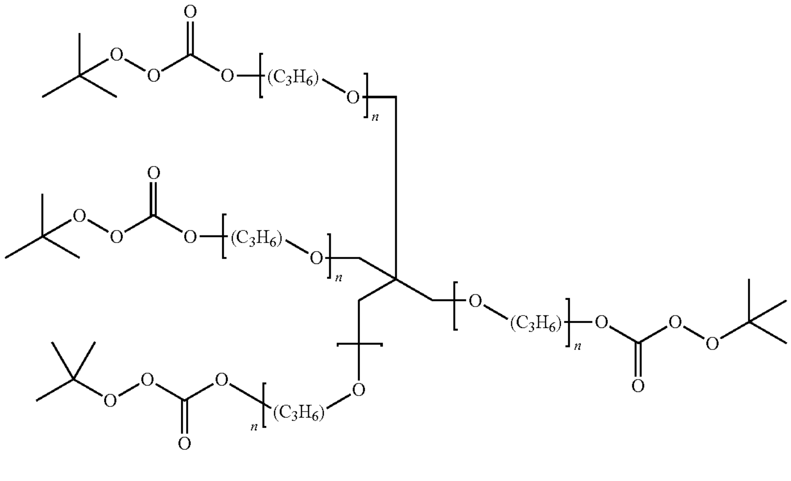

C

Otherwise, identically composed, non-microemulsified preparations, which were used with or without UV radiation like the preparations according to the invention, served as a reference. For this, white cotton swatches (4 cm×4 cm) provided with standardized blueberry soiling were each provided with 10 ml of the test formulation and irradiated for 15 minutes using a UV-C lamp at a wavelength of 253.7 nm hydrophobic precursor compound in microemulsified form, from which a peroxycarboxylic acid or the salt thereof can be released by UV radiation, and applying UV radiation on the liquid.

2. The method according to claim 1, wherein the precursor compound is selected from the peroxoesters of one of the general formulas (I) to (VI), (I)

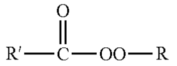

(II)

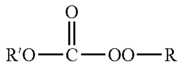

(III)

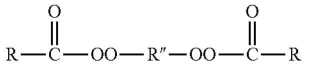

(IV)

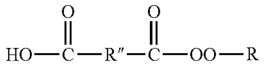

(V)

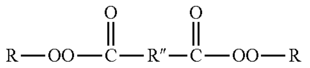

(VI)

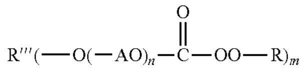

in which R represents a linear or branched-chain alkyl group having 1 to 30 C atoms, R' represents a linear or branched-chain alkyl group having 1 to 30 C atoms, R" represents a linear or branched-chain alkylene group having 1 to 30 C atoms, R'" represents an m-valent linear or branched-chain alkyl group having 2 to 9 C atoms, A represents an alkylene group having 2 to 4 C atoms, m represents a number from 2 to 6, and n represents a number from 2 to 30, and mixtures thereof.

3. The method according to claim 2, wherein

R represents a linear or branched-chain alkyl group having 2 to 20 C atoms, R' represents a linear or branched-chain alkyl group having 2 to 20 C atoms, R" represents a linear or branched-chain alkylene group having 2 to 20 C atoms, R'" represents an m-valent linear or branched-chain alkyl group having 3 to 5 C atoms, A represents an alkylene group having 2 to 4 C atoms, m represents a number from 3 or 4, and n represents a number from 3 to 15, and mixtures thereof.

4. The method according to claim 1, wherein the precursor compound has an n-octanol/water partition coefficient log $K_{ow}$ at 20° C. of at least 0.5.

5. The method according to claim 1, wherein the liquid contains 0.1 wt. % to 20 wt. % of the hydrophobic precursor compound.

6. The method according to claim 1, wherein the liquid contains 2 wt. % to 12 wt. % of the hydrophobic precursor compound, and water up to 100 wt. %.

7. The method according to claim 1, wherein the liquid contains from 4 wt. % to 10 wt. % of the hydrophobic precursor compound, and water up to 100 wt. %.

8. The method according to claim 1, wherein it is carried out at temperatures below room temperature or at temperatures in the range from 5° C. to 60° C.

9. The method according to claim 1, wherein it is carried out at temperatures below room temperature or at temperatures in the range from 10° C. to 40° C.

10. The method according to claim 1, wherein the washing or cleaning liquid is in contact with the textile to be washed or the hard surface to be cleaned for a period from 1 minute to 2 hours, and/or in that the UV radiation duration is in the range from 5 minutes to 40 minutes, and/or in that the energy density of the UV radiation is in the range from 150 $mJ/cm^2$ to 400 $mJ/cm^2$.

11. The method according to claim 1, wherein the washing or cleaning liquid is in contact with the textile to be washed or the hard surface to be cleaned for a period from 2 minutes to 1 hour, and/or in that the UV radiation duration is in the range from 6 minutes to 30 minutes, and/or in that the energy density of the UV radiation is in the range from 200 $mJ/cm^2$ to 300 $mJ/cm^2$.

12. The method according to claim 1, wherein the UV radiation has wavelengths in the range from 240 nm to 270 nm.

* * * * *